United States Patent
Jiang et al.

(10) Patent No.: US 12,152,150 B2
(45) Date of Patent: Nov. 26, 2024

(54) HIGH-VISCOSITY, HIGH-ELASTICITY, AND ANTI-AGING COMPOSITE MODIFIED ASPHALT AND A PREPARATION METHOD THEREOF

(71) Applicant: Sichuan Road and Bridge Construction Group Co., Ltd., Sichuan (CN)

(72) Inventors: Shuangquan Jiang, Sichuan (CN); Jian Yang, Sichuan (CN); Peilong Li, Sichuan (CN); Wei Lu, Sichuan (CN); Liuda Cheng, Sichuan (CN); Yi Pei, Sichuan (CN); Zhan Ding, Sichuan (CN); Jianglin Du, Sichuan (CN); Haiqing Li, Sichuan (CN); Jixiang Pu, Sichuan (CN); Qingyun Li, Sichuan (CN); Maoqin Niu, Sichuan (CN); Jianming Zhang, Sichuan (CN); Wanchun Liu, Sichuan (CN)

(73) Assignee: Sichuan Road and Bridge Construction Group Co., Ltd., Chengdu (CN)

( * ) Notice: Subject to any disclaimer, the term of this patent is extended or adjusted under 35 U.S.C. 154(b) by 0 days.

(21) Appl. No.: 18/431,649

(22) Filed: Feb. 2, 2024

(65) Prior Publication Data
US 2024/0270968 A1    Aug. 15, 2024

(30) Foreign Application Priority Data
Feb. 3, 2023 (CN) .......................... 202310052820.4

(51) Int. Cl.
| | | |
|---|---|---|
| *C08L 95/00* | (2006.01) | |
| *C08F 236/08* | (2006.01) | |
| *C08K 3/06* | (2006.01) | |
| *C08K 5/12* | (2006.01) | |
| *C08K 5/3465* | (2006.01) | |
| *C08L 9/06* | (2006.01) | |
| *C08L 91/00* | (2006.01) | |
| *C08L 93/04* | (2006.01) | |

(52) U.S. Cl.
CPC ............ *C08L 95/00* (2013.01); *C08F 236/08* (2013.01); *C08K 3/06* (2013.01); *C08K 5/12* (2013.01); *C08K 5/3465* (2013.01); *C08L 9/06* (2013.01); *C08L 91/00* (2013.01); *C08L 93/04* (2013.01); *C08L 2555/10* (2013.01); *C08L 2555/22* (2013.01); *C08L 2555/54* (2013.01); *C08L 2555/60* (2013.01); *C08L 2555/80* (2013.01)

(58) Field of Classification Search
CPC ....................................... C08L 95/00
See application file for complete search history.

(56) References Cited

U.S. PATENT DOCUMENTS

2011/0082240 A1    4/2011    Crews

FOREIGN PATENT DOCUMENTS

| | | | |
|---|---|---|---|
| CN | 101613515 | A | 12/2009 |
| CN | 106479204 | A | 3/2017 |
| CN | 107722648 | A | 2/2018 |
| CN | 111777863 | A | 10/2020 |
| CN | 115785689 | A * | 3/2023 |
| JP | 2016210878 | A | 12/2016 |
| WO | 2016210379 | A1 | 12/2016 |

OTHER PUBLICATIONS

WIPO Machine Translation of CN 115785689A (Year: 2024).*
DERWENT Summary Cn 115785689A from SEARCH (Year: 2024).*

* cited by examiner

*Primary Examiner* — Alexandra M Moore
(74) *Attorney, Agent, or Firm* — The Sun IP Law

(57) ABSTRACT

The disclosure discloses a high-viscosity, high-elasticity, and anti-aging composite modified asphalt and a preparation method thereof, belongs to the technical field of road engineering materials, and solves the technical problem that the comprehensive performance of an existing asphalt ultrathin wearing layer needs to be further improved so as to prolong the service life of a pavement surface layer and reduce the pavement maintenance costs. The composite modified asphalt is prepared from the following components in parts by mass: 100 parts of a matrix asphalt, 10 to 15 parts of a thermoplastic styrene-butadiene rubber, 5 to 8 parts of a tackifier, 0.5 to 1.5 parts of a plasticizer, 2 to 5 parts of a compatibilizer, 0.1 to 0.4 parts of a stabilizer, and 0.01 to 0.05 parts of an anti-aging agent. The composite modified asphalt prepared by the disclosure has the advantages of high elasticity, high viscosity, excellent aging resistance, etc.

7 Claims, No Drawings

HIGH-VISCOSITY, HIGH-ELASTICITY, AND ANTI-AGING COMPOSITE MODIFIED ASPHALT AND A PREPARATION METHOD THEREOF

TECHNICAL FIELD

The disclosure relates to the technical field of road engineering materials, and in particular to a high-viscosity, high-elasticity, and anti-aging composite modified asphalt and a preparation method thereof.

BACKGROUND

Due to the complex terrain and landforms of our country, for roads, due to many factors such as high temperature and multiple rain in summer of the south, cold and dry in winter of the north, large traffic volume and overloading phenomena, the performance of the road surface will inevitably decay, causing different degrees of damage. Therefore, the demand on road maintenance and repair is growing day by day. At the same time, there are many highways in mountainous areas, and the ratio of bridges and tunnels exceeds 80%, bridges and tunnels have high requirements for the self-weight or elevation control of their pavement layers.

Driven by this strong demand, the asphalt ultra-thin wearing layer technology is developed. An ultra-thin wearing layer can be used to repair the surface layer of the pavement, solve the problems of cracks, aging, rutting and insufficient anti-slip performance of the pavement, and can also be used as an anti-slip wearing layer for new roads including bridge and tunnel pavements. The paving thickness of an ultra-thin wearing layer is generally 15-25 mm. Compared with ordinary wearing layers of 4-5 cm, it can greatly reduce the amount of asphalt and stone and reduce environmental pollution, and thus has significant economic and environmental benefits. Therefore, it has broad application prospects for paving layer of the road surface layer or the maintenance and repair of pavement layer.

However, due to its ultra-thin characteristics and its location on the surface of the pavement, the ultra-thin wearing layer is subject to dual effects of natural environment and traffic load, prone to protruding problems, such as rutting, low-temperature damage or fatigue cracking, and loose peeling and delamination due to insufficient adhesion. Therefore, in order to solve the problems existing in pavement at this stage, it is urgent to improve the existing asphalt ultra-thin wearing layer.

SUMMARY

The technical problem to be solved by the disclosure is to improve the comprehensive performance of the existing ultra-thin asphalt wearing layer so as to prolong the service life of the pavement surface layer and reduce the maintenance cost of the pavement.

The present disclosure solves the problem by means of the following technical solution:

A high-viscosity, high-elasticity, and anti-aging composite modified asphalt comprises the following components in parts by mass:

100 parts of a matrix asphalt, 10 to 15 parts of a thermoplastic styrene-butadiene rubber, 5 to 8 parts of a tackifier, 0.5 to 1.5 parts of a plasticizer, 2 to 5 parts of a compatibilizer, 0.1 to 0.4 parts of a stabilizer, and 0.01 to 0.05 parts of an anti-aging agent.

The present disclosure modifies the matrix asphalt by adding various modifiers. The thermoplastic styrene-butadiene rubber can take into account the high and low temperature performance of the modified asphalt, and can significantly improve the dynamic viscosity of the asphalt at 60° C. Then, by means of the synergistic effect of the tackifier, plasticizer, compatibilizer, stabilizer and anti-aging agent, a high-viscosity, high-elasticity, and anti-aging composite modified asphalt is obtained.

In a preferred high-viscosity, high-elasticity, and anti-aging composite modified asphalt of the present disclosure, the tackifier is a compound of a resin and a polyisoprene derivative, and the resin is a rosin modified resin.

In the preferred high-viscosity, high-elasticity, and anti-aging composite modified asphalt of the present disclosure, the mass ratio of the resin to the polyisoprene derivative is 2:1.

In the present disclosure, the tackifier is selected based on the principle that the viscosity of the asphalt is increased by a physical and chemical combination modification method. Wherein, the rosin modified resin and the thermoplastic styrene-butadiene rubber have good solubility, and can jointly promote the viscosity of the asphalt system. Further, the branch chain of the polyisoprene derivative contains a monomethyl maleate functional group of a structural formula:

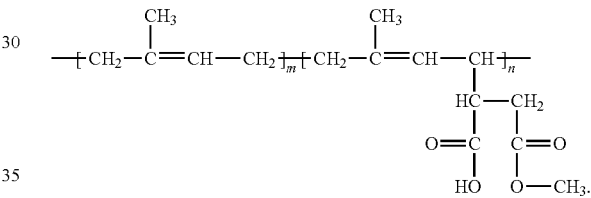

—OH bond in the carboxyl group is easy to break during a high-temperature shear process to form an unsaturated carboxylate group, which can undergo an esterification reaction with an alcohol in the asphalt. As the main chain of the polyisoprene derivative is formed by addition polymerization of isoprene small molecules, its molecular structure is similar to the thermoplastic styrene-butadiene rubber, after high-speed shearing at a high temperature, the polyisoprene derivative and the thermoplastic styrene-butadiene rubber will be broken into small molecular chains, and then under the action of a stabilizer and temperature drop, they will indistinguishably undergo polymerization and cross-linking reactions, realizing the polyisoprene derivative molecules are "bridges", and the thermoplastic styrene-butadiene rubber is combined with asphalt molecules in a chemically modified way to form a relatively stable polymer system, and thus the viscosity is significantly improved.

In the preferred high-viscosity, high-elasticity, and anti-aging composite modified asphalt of the present disclosure, the thermoplastic styrene-butadiene rubber has a linear structure and a block ratio S/B of 30/70, its appearance is white rod, and its amount is 10-15% by the mass of the matrix asphalt.

In the preferred high-viscosity, high-elasticity and anti-aging composite modified asphalt of the present disclosure, the plasticizer is dioctyl phthalate, the compatibilizer is an extract oil from furfural refining, the stabilizer is sulfur, and the anti-aging agent is 9,9-dimethylacridine.

The dioctyl phthalate is a colorless transparent liquid with stable chemical properties. As an ideal toughening material, the dioctyl phthalate is more viscous than the dibutyl phthalate. However, the dibutyl phthalate has a small molecular weight, and thus has certain side effects on asphalt viscosity increase, and is easy to volatilize, and thus has a greater impact on the body health of production and construction personnel. Therefore, the selection of octyl phthalate with a larger molecular weight and a better plasticizing effect is beneficial to the viscosity of the asphalt.

The extract oil from furfural refining is a dark green liquid.

Further, the sulfur is in the form of light yellow powder with a sulfur content >99%.

The extract oil from furfural refining can effectively promote the full swelling of the thermoplastic styrene-butadiene rubber and the asphalt, and achieve a better modification effect. Sulfur can be used as a stabilizer to promote the cross-linking reaction of the thermoplastic styrene-butadiene rubber, the tackifier and the matrix asphalt and improve the interfacial energy between the polymers, so as to form a relatively stable asphalt system.

A preparation method for a high-viscosity, high-elasticity, and anti-aging composite modified asphalt, which is used to prepare the above-mentioned composite modified asphalt, comprises the following steps:

Step 1: melting a matrix asphalt and maintaining the temperature, adding weighed plasticizer, compatibilizer and anti-aging agent to the molten asphalt, and dispersing evenly;

Step 2: adding a thermoplastic styrene-butadiene rubber to the asphalt obtained in the step 1, swelling, then heating up, and shearing at a high speed to completely dissolve the thermoplastic elastomer in the asphalt;

Step 3: adding a tackifier to the asphalt obtained in the step 2, adding a stabilizer after high-speed shearing, and then shearing for stable crosslinking;

Step 4: developing the asphalt obtained in the step 3, and regularly removing gas, so as to obtain a high-viscosity, high-elasticity, high-performance, and anti-aging composite modified asphalt.

In the present disclosure, the plasticizer is added before the thermoplastic styrene-butadiene rubber, so that the affinity and compatibility of the plasticizer promote the mixing of the thermoplastic styrene-butadiene rubber and the asphalt, thereby accelerating the swelling speed of the thermoplastic styrene-butadiene rubber, reducing the swelling time of SBS and improving its swelling and modification effects.

In a preferred preparation method for a high-viscosity, high-elasticity, and anti-aging composite modified asphalt of the present disclosure, the specific method of the step 1 comprises: firstly, placing the matrix asphalt into an oven at 125-145° C. to completely melt the matrix asphalt, then maintaining the temperature of the matrix asphalt at 145-155° C. in an electric heating mantle, adding the weighed plasticizer, compatibilizer and anti-aging agent into the melted asphalt, stir with glass rod for 5-8 min, and stirring to make same evenly dispersed in the matrix asphalt.

In the preferred preparation method for a high-viscosity, high-elasticity, and anti-aging composite modified asphalt of the present disclosure, the specific method of the step 2 comprises: adding the weighed thermoplastic styrene-butadiene rubber to the asphalt obtained in the step 1, stirring with a glass rod and swelling for 10-15 min, then heating the temperature of the asphalt to 180±5° C., and shearing by a high speed shearing machine at a high speed of 4500-5500 r/min for 20-40 min to completely dissolve the thermoplastic elastomer in the asphalt.

In the preferred preparation method for a high-viscosity, high-elasticity, and anti-aging composite modified asphalt of the present disclosure, the specific method of said the step 3 comprises: adding weighed tackifier, shearing at a rotating speed of 4000-5000 r/min for 15-30 min, finally adding weighed sulfur, and shearing at a rotating speed of 3500-4000 r/min for 10-20 min for stable cross-linking.

In the preferred preparation method for a high-viscosity, high-elasticity, and anti-aging composite modified asphalt of the present disclosure, the specific step of the step 4 comprises: after shearing is completed, transferring a modified asphalt sample into an oven at 170-180° C. for development for 45 minutes, and stirring the asphalt sample by means of a glass rod every 10-15 minutes to discharge the air mixed in the asphalt, so as to obtain a high-viscosity, high-elasticity, and anti-aging composite modified asphalt.

The role of development is mainly to promote the full swelling and cross-linking of SBS in the asphalt to form a continuous and stable asphalt system. If the development time is too short, it may lead to insufficient swelling and poor storage stability. If the development time is too long, asphalt aging will easily occur, which will affect the performance of the modified asphalt. This technology changes the order of adding the plasticizer. Adding the plasticizer earlier can enhance the softening and swelling effects of SBS and other polymers, and appropriately shorten the development time.

The present disclosure has the following advantages and beneficial effects:

1. The present disclosure adopts matrix asphalt, a polyisoprene derivative and a rosin resin, a thermoplastic styrene-butadiene rubber, dioctyl phthalate, an extract oil from furfural refining, sulfur, and an anti-aging agent to prepare a high-viscosity, high-elasticity, and anti-aging composite modified asphalt by means of high-speed shearing at a high temperature. The composite modified asphalt has excellent comprehensive properties. The dynamic viscosity at 60° C. is greater than 250,000 Pas, the softening point is above 95° C., the low temperature ductility at 5° C. is greater than 40 cm, and the elastic recovery at 25° C. exceeds 99%. The composite modified asphalt can greatly improve the high-temperature rutting resistance, low-temperature cracking resistance and thermal oxygen and ultraviolet aging resistance of an ultra-thin wearing layer mixture, and play a role in bridge and tunnel pavement or road surface maintenance, thereby extending the service life of road pavement.

2. The present disclosure accelerates the swelling speed of the thermoplastic styrene-butadiene rubber by adding the plasticizer before SBS, which can enhance the softening and swelling effects of SBS and other polymers and appropriately shorten the development time.

3. The thermoplastic styrene-butadiene rubber can take into account the high and low temperature performance of the modified asphalt, and can significantly improve the dynamic viscosity of the asphalt at 60° C. The tackifier improve asphalt viscosity by physically and chemically combined modification, wherein, the rosin modified resin and the thermoplastic styrene-butadiene rubber have good solubility, and can jointly promote the viscosity of the asphalt system. Further, the branch chain of the polyisoprene derivative contains a monomethyl maleate functional group, —OH bond in the carboxyl group is easy to break during a high-temperature modification process to form an unsaturated carboxylate ion, which can undergo an esterification reaction with an alcohol substance in the asphalt. As the main chain of the polyisoprene derivative is formed by addition polymerization of isoprene small molecules, its molecular structure is similar to the thermoplastic styrene-butadiene rubber. After high-speed shearing at a high temperature, the polyisoprene derivative and the thermoplastic styrene-butadiene rubber will be broken into small molecular chains, and then under the action of a stabilizer and temperature drop, they will indistinguishably undergo polymerization and cross-linking reactions, realizing the polyisoprene derivative molecules are "bridges", and the thermoplastic styrene-butadiene rubber is combined with asphalt molecules in a chemically modified way to form a relatively stable polymer system, and thus the viscosity is significantly improved. Dioctyl phthalate has stable chemical properties, and generally does not react with the thermoplastic styrene-butadiene rubber or other high molecular polymer, and can effectively improve the low-temperature ductility of the modified asphalt, being an ideal toughening material. The extract oil from furfural refining can effectively promote the full swelling of the thermoplastic styrene-butadiene rubber and the asphalt, and achieve a better modification effect. Sulfur can be used as a stabilizer to promote the cross-linking reaction of the thermoplastic styrene-butadiene rubber, the tackifier and the matrix asphalt and improve the interfacial energy between the polymers, so as to form a relatively stable asphalt system.

DETAILED DESCRIPTION OF THE EMBODIMENTS

In order to make the purpose, technical solutions and advantages of the present disclosure clearer, the present disclosure will be further described in detail in conjunction with the following embodiments. The schematic embodiments of the present disclosure and their descriptions are only used to explain the present disclosure, and are not intended to limit the present disclosure.

Embodiment 1

Step 1: first put 500 g of matrix asphalt in an oven at 135° C. to melt it completely, then transferred it into an electric heating mantle and maintained the temperature at 150° C., then added 5 g of plasticizer dioctyl phthalate, 15 g of compatibilizer extract oil from furfural refining and 0.25 g of anti-aging agent 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a tackifier, i.e. a compound of a rosin modified resin and a polyisoprene derivative with a mass ratio of 2:1, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 2

The difference between this embodiment and embodiment 1 was that the tackifier comprises only a rosin resin, and the specific steps were as follows:

Step 1: first put 500 g of matrix asphalt in an oven at 135° C. to melt it completely, then transferred it into an electric heating mantle and maintained the temperature at 150° C., then added 5 g of dioctyl phthalate, 15 g of an extract oil from furfural refining and 0.25 g of 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a rosin modified resin, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 3

The difference between this embodiment and embodiment 1 was that the tackifier comprises only a polyisoprene derivatives, and the specific steps were as follows:

Step 1: first put 500 g of matrix asphalt in an oven at 135° C. and heated so as to melt it completely, then transferred it into an electric heating mantle and maintained the temperature at 150° C., then added 5 g of dioctyl phthalate, 15 g of an extract oil from furfural refining and 0.25 g of 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a polyisoprene derivative, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 4

The difference between this embodiment and embodiment 1 was that the mass ratio of the rosin modified resin to the polyisoprene derivative was 1:2, and the specific steps were as follows:

Step 1: first put 500 g of matrix asphalt in an oven at 135° C. and heated so as to melt it completely, then transferred it into an electric heating mantle and maintained the temperature at 150° C., then added 5 g of dioctyl phthalate, 15 g of an extract oil from furfural refining and 0.25 g of 9,9- dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a tackifier, i.e. a compound of a rosin modified resin and a polyisoprene derivative with a mass ratio of 1:2, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 5

The difference between this embodiment and embodiment 1 was that the plasticizer was added in the step 3, and the specific steps were as follows:

Step 1: first put 500 g of matrix asphalt in an oven at 135° C. and heated so as to melt it completely, then transferred it into an electric heating mantle and maintained the temperature at 150° C., then added 15 g of an extract oil from furfural refining and 0.25 g of 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a tackifier, i.e. a compound of a rosin modified resin and a polyisoprene derivative with a mass ratio of 2:1, sheared at a high speed of 4500 r/min for 20 min, then added 5 g of dioctyl phthalate sheared 10 min, and finally added 1.25 g of sulfur, and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 6

The difference between this embodiment and embodiment 1 was that no plasticizer was added, and the specific steps were as follows:

Step 1: first put 500 g of matrix asphalt in an oven at 135° C. and heated so as to melt it completely, then transferred it into an electric heating mantle and maintained the temperature at 150° C., then added 15 g of an extract oil from furfural refining and 0.25 g of 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a compound of a rosin modified resin and a polyisoprene derivative with a mass ratio of 2:1, sheared at a high speed of 4500 r/min for 20 min, then added 1.25 g of sulfur, and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

Embodiment 7

The difference between this embodiment and embodiment 1 was that the development time was 30 minutes, and the specific steps were as follows:

Step 1: first put 500 g of matrix asphalt in an oven at 135° C. and heated so as to melt it completely, then transferred it into an electric heating mantle and maintained the temperature at 150° C., then added 5 g of dioctyl phthalate, 15 g of an extract oil from furfural refining and 0.25 g of 9,9-dimethylacridine to the matrix asphalt, stirred with a glass rod for 5 min to make them evenly dispersed in the asphalt.

Step 2: added 60 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a compound of a rosin modified resin and a polyisoprene derivative with a mass ratio of 2:1, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 30 minutes, and stirred the asphalt sample with a glass rod every 15 minutes to discharge the air mixed in the asphalt, so as to obtain a high-viscosity, high-elasticity, and anti-aging composite modified asphalt.

Embodiment 8

The difference between embodiment 8 and embodiment 1 was that the amount of SBS was 7%. Specific steps were as follows:

Step 1: first put 500 g of matrix asphalt in an oven at 135° C. and heated so as to melt it completely, then transferred it into an electric heating mantle and maintained the temperature at 150° C., then added 5 g of dioctyl phthalate, 15 g of an extract oil from furfural refining and 0.25 g of 9,9-dimethylacridine to the matrix asphalt, stirred with a glass rod for 5 min to make them evenly dispersed in the asphalt.

Step 2: added 35 g of a thermoplastic styrene-butadiene rubber, YH791 type, to the asphalt obtained in the step 1, and stirred with a glass rod to make it swell for 10 minutes. Then, heated the asphalt to 180±5° C., turned on a high-speed shearing machine, and sheared at a high speed of 5000 r/min for 30 min, so that the thermoplastic elastomer was completely dissolved in the asphalt.

Step 3: added 35 g of a compound of a rosin modified resin and a polyisoprene derivative with a mass ratio of 2:1, sheared at a high speed of 4500 r/min for 20 min, and finally added 1.25 g of sulfur and sheared at a speed of 4000 r/min for 10 min for stable crosslinking.

Step 4: immediately after shearing, transferred the modified asphalt sample into an oven at 175° C. to develop for 45 minutes, and stirred the asphalt sample with a glass rod every 15 minutes to discharge the air mixed in the asphalt, so as to obtain a high-viscosity, high-elasticity, and anti-aging composite modified asphalt.

The modified asphalt prepared in the embodiments was tested for relevant performance indicators, and the test results were shown in Table 1 below:

The viscosity high and low was not only related to the tackifier, but also had a lot to do with the amount of SBS. However, the higher the SBS content, the worse the workability. The addition of the tackifier could not only increase the viscosity, but also had a certain effect on improving the workability, but had a certain impact on the low temperature ductility. In the present disclosure, by compounding SBS and the tackifier and combining the compound with other substances, a high-viscosity, high-elasticity, and anti-aging composite modified asphalt with high comprehensive performance and easy construction was obtained.

In embodiment 1, after RTFOT, the residual needle penetration of the composite modified asphalt at 25° C. was 79%, and the ductility at 5° C. was still greater than 30 cm,

TABLE 1

The basic performance test results of the composite modified asphalt in the embodiments

| performance indicator | embodiment 1 | embodiment 2 | embodiment 3 | embodiment 4 | embodiment 5 | embodiment 6 | embodiment 7 | embodiment 8 |
|---|---|---|---|---|---|---|---|---|
| needle penetration at 25° C./0.1 mm | 51.2 | 52.8 | 45.1 | 47.2 | 50.4 | 44.7 | 47.1 | 58.2 |
| ductility at 5° C./cm | 42.5 | 42.4 | 33.6 | 36.4 | 41.4 | 35.3 | 38.2 | 37.9 |
| softening point/° C. | 96.4 | 94.4 | 97.8 | 95.2 | 95.7 | 97.5 | 96.1 | 87.7 |
| dynamic viscosity at 60° C. | 253248 | 196374 | 286427 | 257539 | 241587 | 294157 | 235362 | 144356 |
| Brookfield viscosity at 180° C. | 2.65 | 2.62 | 2.81 | 2.74 | 2.73 | 2.85 | 2.79 | 2.14 |
| elastic recovery/% | 99 | 98 | 99 | 98 | 99 | 99 | 97 | 96 |
| storage stability for 48 h/° C. | 1.5 | 1.5 | 1.7 | 1.6 | 1.7 | 1.9 | 2.1 | 1.4 |
| residues after RTFOT mass loss/% | 0.25 | 0.25 | 0.26 | 0.27 | 0.25 | 0.27 | 0.26 | 0.28 |
| residue needle penetration at 25° C./% | 79 | 78 | 72 | 73 | 77 | 75 | 74 | 69 |
| residue ductility at 5° C./cm | 34 | 34.2 | 24.8 | 26.5 | 32.5 | 27.1 | 27.5 | 25.8 |

By adjusting the ratio of the resin to the polyisoprene derivative in embodiments 1-4, the performance changes of the modified asphalt were analyzed to optimize the compounding scheme of the tackifier. From the results in the table above, it could be determined that the polyisoprene derivative had a significant effect on the 60° C. dynamic viscosity and softening point of the matrix asphalt, but had a weakening effect on the low-temperature performance of the asphalt. On the other hand, the tackifying resin, although its effect on the high-temperature performance of asphalt was less than that of the polyisoprene derivative, could basically maintain the original good low-temperature performance of SBS. In order to take into account the high and low temperature performance of the high-viscosity asphalt, it was better to compound the tackifier in a mass ratio of the tackifying resin and the polyisoprene derivative of 2:1.

From the results of embodiments 1, 5 and 6, it could be determined that the addition of the plasticizer in advance could improve the swelling effect of the thermoplastic styrene-butadiene rubber in the asphalt, and the storage stability was related to the swelling effect, and thus the addition had a better effect on the low-temperature performance of the asphalt, better flexibility. However, the plasticizer would reduce the 60° C. dynamic viscosity of the modified asphalt to a certain extent. In addition, on the premise of ensuring good swelling and development of the asphalt, sulfur could exert its cross-linking and stabilizing effect, so that the modified asphalt had good dispersion and uniformity.

indicating that the composite modified asphalt could maintain the performance of the original asphalt at a high level after aging, and had significant anti-aging properties.

The disclosure greatly increased the viscosity of the asphalt, maintains good stability and workability, and meanwhile other properties also met the needs of the field.

The specific embodiments described above have further described the purpose, technical solutions and beneficial effects of the present disclosure in detail. It should be understood that the above descriptions are only specific embodiments of the present disclosure and are not intended to limit the scope of the present disclosure. Protection scope, within the spirit and principles of the present disclosure, any modification, equivalent replacement, improvement, etc., shall be included in the protection scope of the present disclosure.

What is claimed is:

1. A high-viscosity, high-elasticity, and anti-aging composite modified asphalt, characterized by, according to parts by mass, comprising the following components:
   100 parts of a matrix asphalt, 12 parts of a thermoplastic styrene-butadiene rubber, 7 parts of a tackifier, 1 part of a plasticizer, 3 parts of a compatibilizer, 0.25 parts of a stabilizer, and 0.05 parts of an anti-aging agent,
   the tackifier is a compound of a resin and a polyisoprene derivative, and the resin is a rosin modified resin, the structural formula of the polyisoprene derivative is:

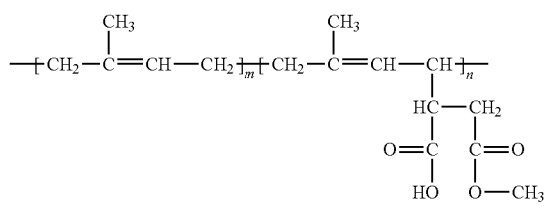

the mass ratio of the resin to the polyisoprene derivative is 2:1, the thermoplastic styrene-butadiene rubber has a linear structure, and has a block ratio S/B of 30/70, the plasticizer is dioctyl phthalate, the compatibilizer is an extract oil from furfural refining, the stabilizer is sulfur, and the anti-aging agent is 9,9-dimethylacridine, the high-viscosity, high-elasticity, and anti-aging composite modified asphalt is prepared by the following method:

step 1: melting a matrix asphalt and maintaining the temperature, adding weighed plasticizer, compatibilizer and anti-aging agent to the molten asphalt, and dispersing evenly;

step 2: adding a thermoplastic styrene-butadiene rubber to the asphalt obtained in the step 1, swelling, then heating up, and shearing at a high speed to completely dissolve the thermoplastic elastomer in the asphalt;

the specific method of the step 2 comprises: adding the weighed thermoplastic styrene-butadiene rubber to the asphalt obtained in step 1, stirring, swelling for 10 min, then heating the asphalt to 180±5° C., and shearing at a high speed of 4500-5500 r/min for 20-40 min to completely dissolve the thermoplastic elastomer in the asphalt;

step 3: adding a tackifier to the asphalt obtained in the step 2, adding a stabilizer after high-speed shearing, and then shearing for stable crosslinking; and step 4: developing the asphalt obtained in the step 3, and regularly removing gas, so as to obtain a high-viscosity, high-elasticity, high-performance, and anti-aging composite modified asphalt;

the specific step of the step 4 comprises: after shearing is completed, transferring a modified asphalt sample into an oven at 170-180° C. for development for 45 minutes, and stirring the asphalt sample every 10-15 minutes to discharge the air mixed in the asphalt, so as to obtain a high-viscosity, high-elasticity, high-performance, and anti-aging composite modified asphalt;

The high-viscosity, high performance, aging resistant composite modified asphalt has a dynamic viscosity of 253248 at 60° C., a needle penetration at 25° C. of 51.2, a ductility at 25° C. of 42.5 cm, a softening point of 96.4° C., a storage stability of 1.5° C. of 48 h, a residual needle penetration at 25° C. of 79% after RTFOT, and a residual ductility at 5° C. of 34 cm.

2. A preparation method for a high-viscosity, high-elasticity, and anti-aging composite modified asphalt, characterized in that the preparation method is used for preparing the composite modified asphalt of claim 1, and comprises the following steps:

step 1: melting a matrix asphalt and maintaining the temperature, adding weighed plasticizer, compatibilizer and anti-aging agent to the molten asphalt, and dispersing evenly;

step 2: adding a thermoplastic styrene-butadiene rubber to the asphalt obtained in the step 1, swelling, then heating up, and shearing at a high speed to completely dissolve the thermoplastic elastomer in the asphalt;

the specific method of the step 2 comprises: adding the weighed thermoplastic styrene-butadiene rubber to the asphalt obtained in step 1, stirring, swelling for 10 min, then heating the asphalt to 180±5° C., and shearing at a high speed of 4500-5500 r/min for 20-40 min to completely dissolve the thermoplastic elastomer in the asphalt;

step 3: adding a tackifier to the asphalt obtained in the step 2, adding a stabilizer after high-speed shearing, and then shearing for stable crosslinking; and step 4: developing the asphalt obtained in the step 3, and regularly removing gas, so as to obtain a high-viscosity, high-elasticity, high-performance, and anti-aging composite modified asphalt;

the specific step of the step 4 comprises: after shearing is completed, transferring a modified asphalt sample into an oven at 170-180° C. for development for 45 minutes, and stirring the asphalt sample every 10-15 minutes to discharge the air mixed in the asphalt, so as to obtain a high-viscosity, high-elasticity, high-performance, and anti-aging composite modified asphalt.

3. The preparation method for a high-viscosity, high-elasticity, and anti-aging composite modified asphalt according to claim 2, wherein the specific method of the step 1 comprises: firstly, placing the matrix asphalt into an oven at 125-145° C. to completely melt the matrix asphalt, then maintaining the temperature of the matrix asphalt at 145-155° C. in an electric heating mantle, adding the weighed plasticizer, compatibilizer and anti-aging agent into the melted asphalt, and stirring to make same evenly dispersed in the matrix asphalt.

4. The preparation method for a high-viscosity, high-elasticity, and anti-aging composite modified asphalt according to claim 2, wherein the specific method of said step 3 comprises: adding weighed tackifier, shearing at a rotating speed of 4000-5000 r/min for 15-30 min, finally adding weighed sulfur, and shearing at a rotating speed of 3500-4000 r/min for 10-20 min for stable cross-linking.

5. The preparation method for a high-viscosity, high-elasticity, and anti-aging composite modified asphalt according to claim 3, wherein the specific method of the step 2 comprises: adding the weighed thermoplastic styrene-butadiene rubber to the asphalt obtained in step 1, stirring, swelling for 10-15 min, then heating the asphalt to 180±5° C., and shearing at a high speed of 4500-5500 r/min for 20-40 min to completely dissolve the thermoplastic elastomer in the asphalt.

6. The preparation method for a high-viscosity, high-elasticity, and anti-aging composite modified asphalt according to claim 3, wherein the specific method of said step 3 comprises: adding weighed tackifier, shearing at a rotating speed of 4000-5000 r/min for 15-30 min, finally adding weighed sulfur, and shearing at a rotating speed of 3500-4000 r/min for 10-20 min for stable cross-linking.

7. The preparation method for a high-viscosity, high-elasticity, and anti-aging composite modified asphalt according to claim 3, wherein the specific step of the step 4 comprises: after shearing is completed, transferring a modified asphalt sample into an oven at 170-180° C. for development for 45 minutes, and stirring the asphalt sample every 10-15 minutes to discharge the air mixed in the asphalt, so as to obtain a high-viscosity, high-elasticity, high-performance, and anti-aging composite modified asphalt.

* * * * *